(12) United States Patent
Chen et al.

(10) Patent No.: US 12,466,852 B2
(45) Date of Patent: Nov. 11, 2025

(54) METHOD FOR EXTRACTION AND PURIFICATION OF HIRUDIN MUTANT AND USE THEREOF

(71) Applicant: SUNGEN BIOSCIENCE CO., LTD., Guangdong (CN)

(72) Inventors: Jiepeng Chen, Shantou (CN); Lili Duan, Shantou (CN); Hongrui Chen, Shantou (CN); Liusong Hu, Shantou (CN); Yufan Chen, Shantou (CN); Lin Hong, Shantou (CN); Zhikai Xu, Shantou (CN); Honglin Ye, Shantou (CN); Yeyu Ji, Shantou (CN); Chunli Cai, Shantou (CN)

(73) Assignee: SUNGEN BIOSCIENCE CO., LTD., Shantou (CN)

( * ) Notice: Subject to any disclaimer, the term of this patent is extended or adjusted under 35 U.S.C. 154(b) by 827 days.

(21) Appl. No.: 17/282,303

(22) PCT Filed: Apr. 16, 2019

(86) PCT No.: PCT/CN2019/082785
§ 371 (c)(1),
(2) Date: Apr. 1, 2021

(87) PCT Pub. No.: WO2020/210965
PCT Pub. Date: Oct. 22, 2020

(65) Prior Publication Data
US 2021/0317162 A1    Oct. 14, 2021

(51) Int. Cl.
*C07K 1/14* (2006.01)
*C07K 14/815* (2006.01)

(52) U.S. Cl.
CPC .............. *C07K 1/14* (2013.01); *C07K 14/815* (2013.01)

(58) Field of Classification Search
CPC .................. C07K 1/14; C07K 14/815
(Continued)

(56) References Cited

U.S. PATENT DOCUMENTS

| 5,650,301 A | * | 7/1997 | Courtney | ............... A61P 7/02 435/243 |
| 2016/0145307 A1 | * | 5/2016 | Shailubhai | ............... C07K 7/08 428/402 |

FOREIGN PATENT DOCUMENTS

| CN | 1536082 A | * | 10/2004 |
| CN | 101779959 A | * | 7/2010 |

(Continued)

OTHER PUBLICATIONS

GenScript, "Hirudin", Jul. 1, 2017, p. 1-3 (URL: https://www.genscript.com/protein/Z02812-Hirudin.html) (Year: 2017).*

(Continued)

*Primary Examiner* — Robert B Mondesi
(74) *Attorney, Agent, or Firm* — Banner & Witcoff, Ltd.

(57) ABSTRACT

Provided are a method for extracting a hirudin mutant, HV2-Lys47, from a fermentation broth of the hirudin mutant HV2-Lys47 produced by the fermentation of *Escherichia coli*, and purifying same, the use of the hirudin mutant HV2-Lys47 in an anticoagulated blood collection tube, and an anticoagulated blood collection tube containing the hirudin mutant HV2-Lys47. In the purification method, a membrane technology and a primary column chromatography technology are used to obtain the hirudin mutant HV2-Lys47.

14 Claims, 3 Drawing Sheets

(58) Field of Classification Search
USPC .......................................................... 530/412
See application file for complete search history.

(56) References Cited

FOREIGN PATENT DOCUMENTS

| CN | 104761635 A | * | 7/2015 | |
|----|-------------|---|--------|---|
| CN | 104774259 A | | 7/2015 | |
| CN | 104926937 A | | 9/2015 | |
| CN | 106834395 A | | 6/2017 | |
| CN | 108220369 A | * | 6/2018 | ........... C07K 14/815 |
| CN | 109206522 A | | 1/2019 | |
| JP | S63-152987 A | | 6/1988 | |

OTHER PUBLICATIONS

Bi et al., "Construction, Expression, and Characterization of Recombinant Hirudin in *Escherichia coli*", Applied Biochemistry and Biotechnology, vol. 95, 2001, p. 23-30. (Year: 2001).*
Biotech, GenScript. "Hirudin—GenScript". Mar. 19, 2007, https://www.genscript.com/protein/Z02812-Hirudin_.html (Year: 2007).*
Japanese Patent Application No. 2021-525292, Notice of Reasons for Refusal dated Jul. 5, 2022.
Bi et al, Construction, Expression, and Characterization of Recombinant Hirudin in *Escherichia coli*:, Applied Biochemistry and Biotechnology, vol. 95, 2001, pp. 23-30.
Chinese Patent Application No. 201910301614.6, first Office Action issued Jul. 2, 2020.
Chinese Patent Application No. 201910301614.6, second Office Action dated Jan. 28, 2021.
Chinese Patent Application No. 201910301614.6, third Office Action dated Aug. 30, 2021.
European Search Report, Patent Application No. 19925351.9, dated Nov. 2, 2021, 9 pages.
Kostromina et al., "Biotechnological Production of Recombinant Analogues of Hirudin-1 from Hirudo medicinalis," Russian Journal of Bioorganic Chemistry, 2012, vol. 38, No. 2, pp. 142-151.
Yongming et al., "Detection of Whole Blood Cell Count by Domestic Hirudin Vacuum Blood Collection Tube," Tianjin Med. J. 38(4), pp. 339-340, Apr. 2010.
Cuicui Huang et al. "Robust preparative-scale extracellular production of hirudin in *Escherichia coli* and its purification and charaterization", Biotechnology Methods, vol. 39, No. 10, Jul. 31, 2012.
Wuguang Lu et al. "Production and Characterization of Hirudin Variant-1 by SUMO Fusion Technology in *E. coli*", Molecular Biotechnology, vol. 53, No. 1, Feb. 28, 2012.
Jan. 21, 2020—(WO) International Search Report and Written Opinion—Appl. No. PCT/CN2019/082785, 11 pages.
Sep. 19, 2024—(IN) Examination Report—App 202147015707.

* cited by examiner

METHOD FOR EXTRACTION AND PURIFICATION OF HIRUDIN MUTANT AND USE THEREOF

REFERENCE TO SEQUENCE LISTING

This application incorporates by reference the contents of an 876 byte text file created on May 31, 2024 and named "1220000276_P_US_sequencelisting.txt," which is the sequence listing for this application.

TECHNICAL FIELD

The present application relates to, including, but not limited to bioengineering technology, in particular to a method for extracting and purifying hirudin mutant HV2-Lys47 (SEQ ID NO.: 1) from a fermentation broth of Escherichia coli for fermentative production of hirudin mutant HV2-Lys47, and the purified hirudin mutant HV2-Lys47 obtained thereby.

The present application further relates to biomedical devices, in particular to the use of the hirudin mutant HV2-Lys47 prepared by purification by the above method in an anticoagulant blood collection tube.

BACKGROUND

Natural hirudin is the most active and the most extensively studied component among the multiple active components that have been extracted from hirudos (leeches) and their salivary glands. It is a small molecular protein (polypeptide) consisting of 65-66 amino acids. Hirudos are rich in hirudin. Hirudin has strong inhibitory effects on thrombin, and is found to be the strongest natural inhibitor specific to thrombin so far. Hirudin can be used for the treatment of various thrombotic diseases, especially venous thrombosis and disseminated intravascular coagulation; also for the prevention of arterial thrombosis after surgery and the prevention of thrombosis after thrombolysis or revascularization; as well as for the improvement of the extracorporeal blood circulation and hemodialysis processes. In microsurgery, a failure often occurs due to vascular thrombosis at anastomotic sites, and by using hirudin, wound healing can be promoted. Studies have also shown that hirudin can also play a role in the treatment of tumors. It can prevent the metastasis of tumor cells, and has been demonstrated to be effective for tumors such as fibrosarcoma, osteosarcoma, angiosarcoma, melanoma and leukemia, etc. Hirudin can also be used in combination with chemotherapy and radiotherapy, attributed to its ability to promote blood flowing in tumors, and thus can enhance the therapeutic effect.

In consideration of the low productivity of natural hirudin and the large amount of clinical use thereof, extensive studies have been conducted on recombinant hirudins both at home and abroad; and recombinant hirudins with similar structures and the same effects as natural hirudin have been developed since the end of 1980s, with high productivity.

However, the existing purification of proteins and peptides generally requires two or three or more chromatographic separations in order to obtain pure products, and the eluants contain large amounts of water and salts, thus causing great pollution to the environment and great pressure on the waste water processing.

At present, hirudin mutants used in the market have an anticoagulant activity of 16000 ATU/mg and a purity of about 93%.

For example, CHEN Huayou et al. (Journal of Anhui Agricultural Sciences, 2009, 37 (34); pp. 16757-16759 and 16768) disclosed that a 95% pure product was finally obtained by centrifuging the fermentation broth, treating with trichloroacetic acid, concentrating and desalting by ultrafiltration, and then subjecting to anion exchange column and S100 molecular sieve column; and WEI Lijun et al. (Proceedings of the 2004 National Symposium on Biotechnology, pp. 104-112) disclosed that a 95% pure product was obtained by three chromatographic separations of macroporous resin chromatography, DEAE chromatography and reversed-phase chromatography. More chromatographic steps lead to higher costs and more time, and also cause more serious pollution to the environment.

Therefore, there is a need for a method for extracting and purifying hirudin mutant HV2-Lys47, which is simple in process, produces less waste water and is suitable for industrial scale-up.

In addition, collection and separation of blood samples are important steps to ensure the quality of blood samples and thus very important in clinical biochemical testing. Traditional sample collection usually takes a long time from the beginning of blood collection to serum separation and testing on machine, which limits the automatic biochemical analyzer from running with high efficiency. Some biochemical laboratories use heparin anticoagulant plasma, in which case, plasma may be obtained by centrifugation and tested on machine immediately after blood collection. However, both heparin sodium anticoagulant plasma and heparin lithium anticoagulant plasma will affect some biochemical indexes.

In 1997, China began to promote vacuum blood collection technology, which is a great improvement to the traditional blood collection method. Since the blood collection procedure is performed in a totally closed system, the possibilities of blood contamination and cross infection are fundamentally eliminated, and blood collection is safer, more accurate and more standardized. Therefore, it is easy to be popularized and promoted. Separation gels, coagulants and various anticoagulants can be added into vacuum blood collection tubes, and the blood collection tubes for different purposes can be distinguished by the colors of the tube caps.

Recently, vacuum blood collection tubes containing coagulants and separation gels have been widely used in biochemical testing, which greatly shorten the time of blood coagulation. Generally, after standing for 20 min, vacuum blood collection tubes can be subjected to centrifugation to obtain serum. However, a proportion of the blood collection tubes have poor centrifugation results, with protein filaments or clots in the serum. Separation gel is a semi-solid inert gel composed of several compounds, which does not affect the content of various components in serum. However, the difference in raw material origin, properties and manufacturing process of coagulants in the tubes may have different effects on biochemical tests.

Natural hirudin is a polypeptide extracted and separated from the salivary glands of blood-sucking hirudos (popular name: leeches), which is an important active component in hirudos, but its productivity is extremely limited and cannot meet the requirements of clinical use.

Therefore, there is a need for an anticoagulant with better anticoagulant activity and from more stable sources.

SUMMARY

The following is a summary of the subject matter described in detail herein. This summary is not intended to limit the protection scope of the claims.

The present application provides a method for extracting and purifying hirudin mutant HV2-Lys47, which is simple in process, produces less waste water and is suitable for industrial scale-up.

In an embodiment of the present application, the present application provides a method for extracting and purifying hirudin mutant HV2-Lys47 (SEQ ID NO.: 1) from a fermentation broth of Escherichia coli for fermentative production of hirudin mutant HV2-Lys47, including:

treating the fermentation broth of Escherichia coli at an elevated temperature to sterilize the fermentation broth and remove impurity proteins;

treating the sterilized fermentation broth by a ceramic membrane or by a centrifuge to remove the bacteria;

optionally, treating the resultant fermentation broth from the ceramic membrane or the centrifuge by an ultrafiltration membrane to remove impurity proteins;

treating the resultant fermentation broth from the ceramic membrane or the centrifuge, or the resultant fermentation broth from the ultrafiltration membrane by a nanofiltration membrane to obtain a concentrated solution of crudely separated hirudin mutant HV2-Lys47;

adding a salt into the concentrated solution of crudely separated hirudin mutant HV2-Lys47 as an auxiliary material, followed by spray drying to obtain dry powder;

dissolving the dry powder in water and filtering out impurities, optionally by filter paper, a sand core funnel or a membrane device;

subjecting the filtrate to molecular sieve column chromatography only once, eluting the same with water, and concentrating the collected solution to obtain a crude hirudin mutant HV2-Lys47; and dissolving the crude hirudin mutant HV2-Lys47 in water, adding a salt or an organic solvent thereto to precipitate the hirudin mutant HV2-Lys47, and drying the same to obtain a pure hirudin mutant HV2-Lys47.

In the above or other embodiments, the elevated temperature may be a high temperature enabling sterilization, such as a temperature of 65° C., 75° C., etc.

In the above or other embodiments, the drying may be vacuum drying.

In the above or other embodiments, the drying may be vacuum lyophilization.

In the above or other embodiments, the sterilized fermentation broth is treated by a centrifuge.

In the above or other embodiments, the centrifuge may be a tube centrifuge or a disk centrifuge.

The purpose of the treatment by a ceramic membrane or a centrifuge is to remove the bacteria, the purpose of the treatment by an ultrafiltration membrane is to remove impurity proteins, and the purpose of the treatment by a nanofiltration membrane is for concentration.

In the above or other embodiments, the treatment at high temperature may be 65° C.-67° C. for 5-20 min, optionally for 10 min.

In the above or other embodiments, the salt may be selected from one or more of sodium chloride, potassium chloride, ammonium sulfate, sodium sulfate or potassium sulfate.

In the above or other embodiments, the molecular sieve column for chromatography may be selected from the group consisting of Sephadex G25, Sephadex G50, Sephadex G75 and Sephadex G100. Those skilled in the art will understand that these molecular sieve columns for chromatography are all commercially available products. The main purpose of using molecular sieve column chromatography is to remove pigments, salts, and polypeptides and polysaccharides whose molecular weights are far away from that of hirudin.

In the above or other embodiments, concentrating the collected solution resulting from the molecular sieve column chromatography may be conducted by vacuum concentration under reduced pressure, nanofiltration membrane concentration or reverse osmosis membrane concentration.

In the above or other embodiments, the organic solvent may be selected from one or more of ethanol, methanol, acetone, isopropanol or acetonitrile.

In the above or other embodiments, the weight in grams of the salt added as an auxiliary material is 5% or more, optionally 10% or more, of the volume in milliliters of the concentrated solution of crudely separated hirudin mutant HV2-Lys47. The inventors of the present application have found that the purpose of purification of the present application can be achieved by adding the salt at a weight volume fraction of 5% or more as described above; and the addition of salt of less than 5% will lead to a large loss of hirudin, while excessive salt addition will lead to an excessively high cost.

In the above or other embodiments, the volume in milliliters of water for dissolving the dry powder is 10 times the weight in grams of the dry powder or more. The dry powder is dissolved in a volume of water to keep the weight in grams of the salt to be 5% or less of the volume in milliliters of the aqueous solution, so that some impurity proteins insoluble in water can be removed by filtration.

In the above or other embodiments, in order to precipitate hirudin mutant HV2-Lys47, the weight in grams of the salt added is 20%-30% of the volume in milliliters of the aqueous solution in which crude hirudin mutant HV2-Lys47 is dissolved, and the volume of the organic solvent added is 5-9 volumes of the aqueous solution in which crude hirudin mutant HV2-Lys47 is dissolved.

The purpose of the step of reprecipitation of recombinant hirudin is to remove polysaccharides and polypeptides whose molecular weights are close to that of hirudin.

In the above or other embodiments, the fermentation broth of Escherichia coli may be produced by culturing the strain Escherichia coli pBH2 CGMCC No. 0908 with pBH-2 as the expression vector.

In the above or other embodiments, the culturing includes culturing under aerobic conditions at temperature of 25° C.-35° C. until the end of logarithmic growth phase, and then the temperature is elevated to 35° C.-45° C. for a further culturing until the yield of the hirudin mutant HV2-Lys47 reaches a peak.

In the present application, the fermentation broth of the hirudin mutant HV2-Lys47 can be obtained by referring to the production method of the patent application No. 201711262810.4, which is hereby incorporated by reference in its entirety, wherein the hirudin mutant HV2-Lys47 of the present application is referred to as "recombinant hirudin" in the patent application No. 201711262810.4. Therefore, herein, "hirudin mutant HV2-Lys47" and "recombinant hirudin" represent the same substance and can be used interchangeably.

Compared with the current methods, the method in the present application employs membrane technology and a primary column chromatography technology, as well as elution with only water, and thus is simple in process, produces less waste water and is suitable for industrial scale-up production of hirudin mutant HV2-Lys47.

In another aspect, the present application provides a hirudin mutant HV2-Lys47 produced according to any of the above methods.

In the another aspect, the present application provides a hirudin mutant HV2-Lys47 produced according to any of the above methods, wherein the anticoagulant activity of the hirudin mutant HV2-Lys47 may be greater than or equal to 18000 ATU/mg. It is known in the art that anticoagulant activity is different from purity. Anticoagulant activity refers to the biological activity unit per milligram of protein, and high purity does not necessarily represent high anticoagulant activity, because active proteins may have a reduced activity due to subtle changes in conformation.

In a further aspect, the present application provides use of hirudin mutant HV2-Lys47 in an anticoagulant blood collection tube.

In the above or other embodiments, the anticoagulant activity of the hirudin mutant HV2-Lys47 may be greater than or equal to 18000 ATU/mg.

In the above or other embodiments, the hirudin mutant HV2-Lys47 may be produced by culturing the strain *Escherichia coli* pBH2 CGMCC No. 0908 with pBH-2 as the expression vector, and the anticoagulant activity of the hirudin mutant HV2-Lys47 may be greater than or equal to 18000 ATU/mg.

In the above or other embodiments, the hirudin mutant HV2-Lys47 may be directly added to the anticoagulant blood collection tube.

In the above or other embodiments, the hirudin mutant HV2-Lys47 may be applied to the anticoagulant blood collection tube by being contained in a coating.

In the above or other embodiments, the hirudin mutant HV2-Lys47 may be used in an amount of 8.5 ug/ml blood.

In the above or other embodiments, the hirudin mutant HV2-Lys47 may be coated onto the anticoagulant blood collection tube by being contained in a coating, and then the coating is dried by vacuum lyophilization. The inventors of the present application have shown in experiments that there is no hirudin activity loss during vacuum lyophilization.

In the above or other embodiments, the anticoagulant blood collection tube may be used to contain blood, and the blood may be used for one or more testis of routine blood tests, blood biochemistries, electrolytes, tumor markers, homocysteine and five items of HBV. The hirudin mutant HV2-Lys47 of the present application does not interfere with the testing results due to its high purity.

In a still further aspect, the present application provides an anticoagulant blood collection tube, which may have the hirudin mutant HV2-Lys47 directly added or is coated with a coating containing the hirudin mutant HV2-Lys47.

In the above or other embodiments, the hirudin mutant HV2-Lys47 may be produced by culturing the strain *Escherichia coli* pBH2 CGMCC No. 0908 with pBH-2 as the expression vector, and the anticoagulant activity of the hirudin mutant HV2-Lys47 may be greater than or equal to 18000 ATU/mg, greater than or equal to 18000 ATU for each 1 mg, and the purity is greater than 95%.

In the anticoagulant blood collection tube of the present application, the hirudin mutant HV2-Lys47 that needs to be added is correspondingly reduced from the original 0.01 mg/ml blood to 8.5 ug/ml blood. In the production process of a blood collection tube, a high-temperature drying process is generally used, and the loss of hirudin activity is about 10%, while in the present application, the vacuum lyophilization method is used, and the hirudin activity is not lost. Moreover, the hirudin mutant HV2-Lys47 used in the present application has almost no interference in the testing of blood indexes due to its high purity.

The inventors of the present application have found through a large number of clinical experimental studies that an anticoagulant blood collection tube containing hirudin mutant HV2-Lys47 may be used for various tests of routine blood tests, blood biochemistries, electrolytes, tumor markers, homocysteine, five items of HBV, etc. The use of hirudin mutant HV2-Lys47 as an anticoagulant for blood collection tubes is characterized by small amount of anticoagulant use, fast reaction speed, anticoagulation of plasma having no interference to testing items, better ability to keep the original status, properties, and form of the blood, being able to have less interference to the blood than other anticoagulants, no hemolysis phenomena, no pseudothrombocytopenia, no interference from heavy metals and impurities, and no need to correct calcium value.

In addition, experiments show that the use of the hirudin mutant HV2-Lys47 as an anticoagulant allows replacement of vacuum blood collection tubes of several colors with one tube, thus completely reducing the burden on medical workers, who need to distinguish the colors of each of the blood collection tubes in order to determine the intended use of the blood samples, thereby reducing the labor intensity and errors of the medical workers. Moreover, it can also reduce the amount of blood collected from patients and reduce the generation of medical wastes, and therefore has great social and economic benefits.

The amino acid sequence of the hirudin mutant HV2-Lys47 of the present application is as shown below:

```
                                              (SEQ ID NO.: 1)
Ile Thr Tyr Thr Asp

CysThrGluSerGlyGlnAsnLeuCysLeuCysGluGlySerAsn Val

CysGly Lys GlyAsn Lys Cys Ile LeuGlySerAsnGly

Lys GlyAsnGlnCys Val ThrGlyGluGlyThr Pro Lys Pro

GluSerHisAsnAsnGly Asp PheGluGlu Ile ProGluGlu

Tyr LeuGln
```

Position of disulfide bonds: Cys6-Cys14; Cys16-Cys28; Cys22-Cys39.

Compared with natural hirudin, in the hirudin mutant HV2-Lys47 or recombinant hirudin of the present application, asparagine at position 47 of natural hirudin is substituted by lysine.

Other aspects will become apparent upon reading and understanding the accompanying drawings and the detailed description.

BRIEF DESCRIPTION OF DRAWINGS

The accompanying drawings are used to provide a further understanding of the technical solutions of the present application and form a part of the specification. Together with the embodiments of the present application, they are used to explain the technical solutions of the present application and do not constitute a limitation on the technical solutions of the present application.

DETAILED DESCRIPTION

In order to make the objects, technical solutions and advantages of the present application clearer, the embodiments of the present application will be described below in detail with reference to the accompanying drawings. It should be noted that the embodiments in this application and the features in the embodiments may be combined with each other arbitrarily unless there is a conflict.

Example 1

Preparation of a Fermentation Broth:

Glycerol stocks of pBH-2 engineering bacteria (Deposit Number: CGMCC No. 0908) were inoculated into a fermentation medium at an inoculation amount of 5%, with a volume of 10 ml/100 ml Erlenmeyer flask, a culturing temperature of 30° C., and a rotation speed of 270 rpm. After inoculation, fermentation was carried out under aerobic conditions until the measured OD value of the fermentation broth tended to be stable, that is, the end of the logarithmic growth phase, which took 3.5 h; then the temperature was raised to 40° C. within 5 min and culturing was continued until a lighter color is shown when the bacteria was stained with crystal violet under microscope, which took 11.5 h, giving a fermentation period of 15 h.

As to the specific operations, see Example 2 of the application No. 201711262810.4.

The medium was composed of the followings and had a pH of 7.2: glucose 10 g/L, sucrose 10 g/L, yeast powder 10 g/L, tryptone 10 g/L, ammonium chloride 0.5 g/L, magnesium sulfate 0.9 g/L, disodium hydrogen phosphate 2 g/L, potassium dihydrogen phosphate 1 g/L, sodium sulfate 5.0 g/L, sodium citrate 0.87 g/L, sodium chloride 16 g/L, vitamin B1 0.05 mg/L, trace elements-ferrous sulfate 40 mg/L, aluminum sulfate 28 mg/L, manganese sulfate 6.1 mg/L, cobalt chloride 4 mg/L, zinc chloride 0.95 mg/L, sodium molybdate 2.16 mg/L, boric acid 0.5 mg/L, copper sulfate 2.93 mg/L and nickel nitrate 32 mg/L. Antibiotic substance AMP 0.5 g/L was added during inoculation. In this example and the following examples, L in g/L was the volume of the final fermentation medium.

The sources of the materials were as shown in the table below:

| Material name | Manufacturer | Grade |
| --- | --- | --- |
| Glycerol | Guangzhou Baojili Chemical Co., Ltd. | Food grade |
| Glucose | Wujiang Jiancheng Fine Chemical Co., Ltd. | Food grade |
| Ammonium nitrate | Guangzhou Chemical Reagent Factory | AR grade |
| Sucrose | Guangzhou Chemical Reagent Factory | AR |
| Peptone | OXOID | AR |
| Yeast powder | OXOID | AR |
| Sodium chloride | Guangdong Chemical Reagent Factory | AR |
| Magnesium sulfate | Guangdong chemical reagent factory | AR |
| Ammonium chloride | Xilong Scientific Co., Ltd. | AR |
| Disodium hydrogen phosphate | Guangdong Chemical Reagent Factory | AR |
| Potassium dihydrogen phosphate | Guangdong Chemical Reagent Factory | AR |
| Sodium sulfate | Sinopharm Chemical Reagent Co. Ltd. | AR |
| Sodium citrate | Shanghai Lingfeng Chemical Reagent Co., Ltd. | AR |
| Vitamin B1 | Shanghai Aibo Trading Co., Ltd. | BR |
| Ferrous sulfate | Guangdong Chemical Reagent Factory | AR |
| Aluminum sulfate | Sinopharm Chemical Reagent Co. Ltd. | AR |
| Manganesium sulfate | Guangdong Taishan Chemical Plant | AR |
| Cobalt chloride | Xilong Scientific Co., Ltd. | AR |
| Zinc chloride | Xilong Chemical Co., Ltd. | AR |
| Sodium molybdate | Guangdong Chemical Reagent Factory | AR |
| Boric acid | Guangdong Chemical Reagent Factory | AR |
| Copper sulfate | Xilong Scientific Co., Ltd. | AR |
| Nickel nitrate | Xilong Chemical Co., Ltd. | AR |
| AMP | CSPC Zhongnuo Pharmacy (Shijiazhuang) Co., Ltd. | Prescription drug of ampicillin sodium for injection |

The hirudin mutant HV2-Lys47 was extracted and purified from the fermentation broth by the following steps:

1) sterilizing the fermentation broth at a high temperature of 65° C. for 5 mmn to remove impurities;
2) centrifuging the sterilized fermentation broth in step 1) by a tube centrifuge (Liaoyang Zhenxing Vacuum Equipment Factory GQB-770) to remove *Escherichia coli*;
3) passing the supernatant of centrifugation in step 2) through an ultrafiltration membrane (Suntar Membrane Technology (Xiamen) Co., Ltd., Model: NFM-84S-6/3) to remove impurity proteins;
4) concentrating the ultrafiltration dialysate in step 3) by passing through a nanofiltration membrane (Suntar Membrane Technology (Xiamen) Co., Ltd., Model: UFM-84S-2) to obtain a concentrated solution of crudely separated hirudin mutant HV2-Lys47;
5) adding sodium chloride as an auxiliary material into the concentrated solution of crudely separated hirudin mutant HV2-Lys47 obtained in step 4), and spray drying the same to obtain dry powder, wherein the weight in grams of the salt added as an auxiliary material was 10% of the volume in milliliters of the concentrated solution of crudely separated hirudin mutant HV2-Lys47;
6) dissolving the dry powder obtained in step 5) in water and filtering out impurities to obtain a filtrate, wherein the volume in milliliters of water for dissolving the dry powder was 10 times the weight in grams of the dry powder;
7) purifying the filtrate in step 6) by molecular sieve column chromatography (Sephadex G50, manufacturer: General Electric Company (GE)) once, eluting the same with pure water, and vacuum concentrating the pooled eluants under reduced pressure; and
8) adding 9 volumes of ethanol into the concentrated eluants obtained in step 7) to precipitate the hirudin mutant HV2-Lys47, and vacuum drying the precipitates under reduced pressure.

Figure 1:
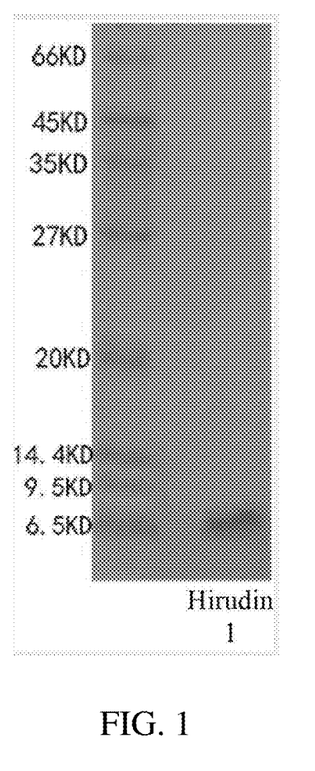
FIG. 1 is an electropherogram of hirudin mutant HV2-Lys47 prepared in Example 1.

The hirudin mutant HV2-Lys47 prepared above was subjected to electrophoretic analysis. As shown in FIG. 1, a single band appeared in the resultant electropherogram (see the band corresponding to hirudin 1 in FIG. 1, wherein hirudin 1 represents hirudin mutant HV2-Lys47 prepared in the present application), and the molecular weight of the purified recombinant hirudin was demonstrated by electrophoresis to be consistent with the theoretical value.

The operating conditions of electrophoresis were: stacking gel 3%, separating gel 15%, loading volume of 30 uL (10,000 ATU/ml), running on gels first at a voltage of 100V for 1 h, then at a voltage of 200V for 2.2 h.

The specific operations of electrophoresis were as follows:
1. installing a precast gel in a mini electrophoresis apparatus, adding SDS-PAGE electrophoresis buffer to cover the top of the gel, and pulling the comb teeth out of sample wells;
2. taking 40 uL of the sample, adding 10 uL of 5× protein loading buffer, mixing, then subjecting the sample in a water bath at 100° C. for 5 min, and taking 40 uL thereof and adding the same to the sample well on the gel;
3. after the completion of sample loading, powering on the electrophoresis apparatus, setting a constant voltage of 150V for about 50 min, and ending the electrophoresis run when the bromophenol blue line reached the bottom of the gel; and
4. fixing for 20 min, staining for 20 min, decolorizing for 2 h, and then observing the result.

According to the analysis of anticoagulant activity by biochemical method determination, the anticoagulant activity of the prepared hirudin mutant HV2-Lys47 was calculated to be 17000 ATU/mg. For the specific determination of anticoagulant activity, reference may be made to the left column of page 84 of the Chinese Pharmacopoeia (2005 edition). Moreover, the purity of the hirudin mutant HV2-Lys47 calculated according to the proportion of color bands in gel electrophoresis had reached to 95%.

Figure 2:
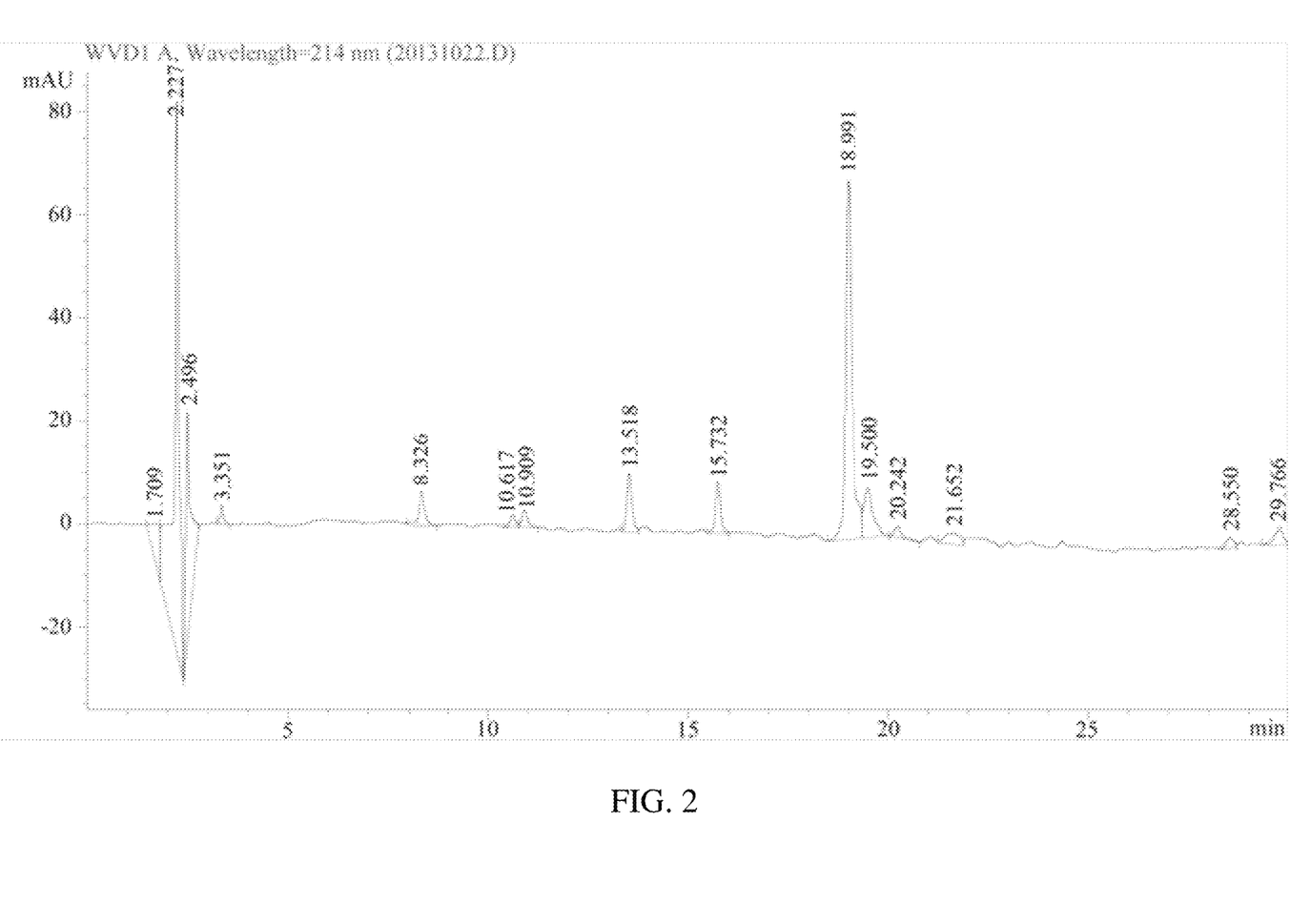
FIG. 2 is an HPLC chromatogram of the hirudin mutant HV2-Lys47 prepared in Example 1, in which the peak with retention time of 18.991 min is the corresponding peak of the hirudin mutant HV2-Lys47.
Figure 3:
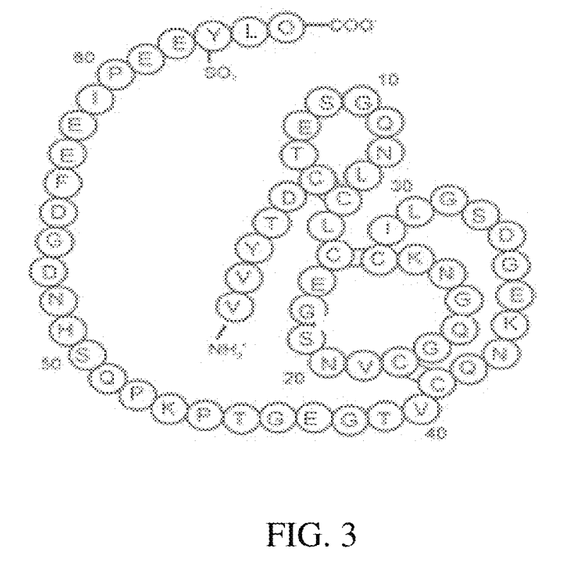
FIG. 3 is an amino acid residue sequence diagram of the hirudin mutant HV2-Lys47.
Figure 4:
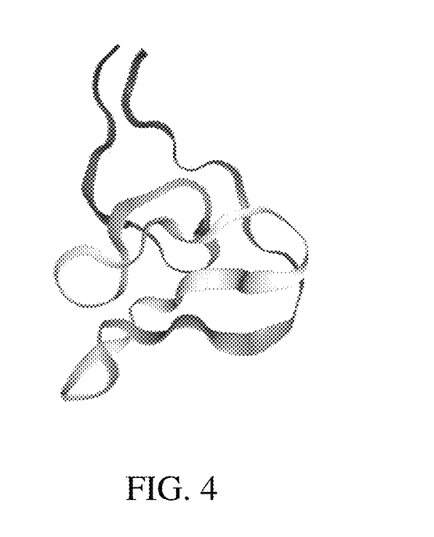
FIG. 4 is the three-dimensional structural diagram of hirudin mutant HV2-Lys47 simulated on the biomolecular database webpage (https://www.rcsb.org/).

In addition, it was demonstrated through HPLC determination that, there was indeed a significantly large peak of the hirudin mutant HV2-Lys47 in the prepared hirudin mutant HV2-Lys47, as shown in FIG. 2.

Example 2

Hirudin mutant HV2-Lys47 was prepared and purified by the method of Example 1, except that in step 2), *Escherichia coli* was removed by a disk centrifuge (Alfa laval stainless products skogstop: 881095-05-S/01), and that in step 5), the weight in grams of the salt added as an auxiliary material was 8% of the volume in milliliters of the concentrated solution of crudely separated hirudin mutant HV2-Lys47.

The resultant hirudin mutant HV2-Lys47 was subjected to electrophoretic analysis, and the results were the same as those shown in FIG. 1, in which there was only shown a single band in the electropherogram.

The anticoagulant activity of the obtained hirudin mutant HV2-Lys47 was tested to be 15800 ATU/mg, and the purity was about 93%.

Example 3

Hirudin mutant HV2-Lys47 was prepared and purified by the method of Example 1, except that in step 2), *Escherichia coli* was removed by a ceramic membrane (Suntar Membrane Technology (Xiamen) Co., Ltd.).

The resultant hirudin mutant HV2-Lys47 was subjected to electrophoretic analysis, and the results were the same as those shown in FIG. 1, in which there was only shown a single band in the electropherogram.

The anticoagulant activity of the obtained hirudin mutant HV2-Lys47 was tested to be 16800 ATU/mg, and the purity was 93% or more.

Example 4

Recombinant hirudin was extracted and purified by the method of Example 1, except that in step 2), *Escherichia coli* was removed by a hollow fiber membrane (Suntar Membrane Technology (Xiamen) Co., Ltd.).

The resultant hirudin mutant HV2-Lys47 was subjected to electrophoretic analysis, and the results were the same as those shown in FIG. 1, in which there was only shown a single band in the electropherogram.

The anticoagulant activity of the obtained hirudin mutant HV2-Lys47 was tested to be 16000 ATU/mg, and the purity was 93% or more.

Example 5

Recombinant hirudin was purified by the method of Example 1, except that in step 8), 8 volumes of methanol was added for precipitation.

The resultant hirudin mutant HV2-Lys47 was subjected to electrophoretic analysis, and the results were the same as those shown in FIG. 1, in which the hirudin mutant HV2-Lys47 was shown as a single band in the electropherogram.

The anticoagulant activity of the obtained hirudin mutant HV2-Lys47 was tested to be 15800 ATU/mg, and the purity was about 93%.

Example 6

Recombinant hirudin was extracted and purified by the method of Example 1, and in step 8), 5 volumes of acetone was added for precipitation.

The resultant hirudin mutant HV2-Lys47 was subjected to electrophoretic analysis, and the results were the same as those shown in FIG. 1, in which the hirudin mutant HV2-Lys47 was shown as a single band in the electropherogram.

The anticoagulant activity of the obtained hirudin mutant HV2-Lys47 was tested to be 17000 ATU/mg, and the purity was 95%

Example 7

Recombinant hirudin was extracted and purified by the method of Example 1, except that in step 8), ammonium sulfate with saturation of 75% was used for precipitation, wherein the weight in grams of ammonium sulfate was 20% of the volume in milliliters of the aqueous solution in which the crude hirudin mutant HV2-Lys47 was dissolved.

The resultant hirudin mutant HV2-Lys47 was subjected to electrophoretic analysis, and the results were the same as those shown in FIG. 1, in which there was only shown a single band in the electropherogram.

The anticoagulant activity of the obtained hirudin mutant HV2-Lys47 was tested to be 15000 ATU/mg.

Example 8

Recombinant hirudin was extracted and purified by the method of Example 1, except that the sterilized fermentation broth was directly subjected to separation by a ceramic membrane to remove *Escherichia coli* from the fermentation broth, and the dialysate of the ceramic membrane was then treated by a nanofiltration membrane once, and that in step 8), sodium chloride was used for precipitation, wherein the weight in grams of sodium chloride was 30% of the volume in milliliters of the aqueous solution in which the crude hirudin mutant HV2-Lys47 was dissolved.

The resultant hirudin mutant HV2-Lys47 was subjected to electrophoretic analysis, and the results were the same as those shown in FIG. 1, in which there was only shown a single band in the electropherogram.

The anticoagulant activity of the obtained hirudin mutant HV2-Lys47 was tested to be 14500 ATU/mg.

Example 9

Recombinant hirudin was extracted and purified by the method of Example 1, except that in step 8), 9 times volume of isopropanol was used to precipitate hirudin mutant HV2-Lys47.

The resultant hirudin mutant HV2-Lys47 was subjected to electrophoretic analysis, and the results were the same as those shown in FIG. 1, in which there was only shown a single band in the electropherogram.

The anticoagulant activity of the obtained hirudin mutant HV2-Lys47 was tested to be 18000 ATU/mg, and the purity was 98%.

Example 10

Effects of drying process on the activity of hirudin mutant HV2-Lys47 in anticoagulant blood collection tubes were studied.

The hirudin prepared in Example 9 was dissolved in sterile pure water with a dissolution concentration of 3.4 g/100 ml pure water. 2 ml blood collection tubes were used, and each of them was sprayed with the solution of the prepared hirudin mutant HV2-Lys47 by needle spray, and then dried.

The common drying process in the art is high temperature drying: drying three times at 45° C., 50° C. and 70° C., three times for each temperature, and 60 seconds each time.

The drying method in the present application is: drying the sprayed blood collection tubes in a vacuum lyophilizer at a temperature of −50° C. and a vacuum degree of −4 Mpa.

The effects of high temperature drying and vacuum lyophilization methods on the activity of hirudin mutant HV2-Lys47 were as shown in Table 1 below.

TABLE 1

| Content of hirudin mutant HV2-Lys47 | Drying method | Activity after drying | Activity loss |
|---|---|---|---|
| 306ATU/tube | Drying three times at 45° C., 60 seconds each time | 276 | 9.8% |
| | Drying three times at 50° C., 60 seconds each time | 245 | 19.9% |
| | Drying three times at 70° C., 60 seconds each time | 160 | 47.7% |
| | Drying for 40 min at −50° C. and with a vacuum degree of −4 Mpa | 304 | 0.65% |

It can be seen from the table that, when dried by vacuum lyophilization, the activity loss of the coated hirudin mutant HV2-Lys47 was the smallest.

Example 11

Effects of the amount of the hirudin mutant HV2-Lys47, which was prepared and vacuum-lyophilized in Example 9, on blood coagulation were as shown in Table 2 below:

TABLE 2

| Amount of hirudin mutant HV2-Lys47 | Blood collection volume (mg) | Coagulation (ml) |
|---|---|---|
| 0.001 | 2 | Quick coagulation |
| 0.005 | 2 | No coagulation |
| 0.008 | 2 | No coagulation |
| 0.02 | 2 | No coagulation |
| 0.08 | 2 | No coagulation |
| 0.16 | 2 | No coagulation |
| 0.5 | 2 | No coagulation |
| 1 | 2 | No coagulation |
| 5 | 2 | No coagulation |
| 10 | 2 | No coagulation |
| 15 | 2 | No coagulation |
| 20 | 2 | No coagulation |

It can be seen from the above table that anticoagulant effect can be achieved when the amount of the hirudin mutant HV2-Lys47 added in the blood collection tube is 0.005 mg or more.

Example 12

Effects of the hirudin mutant HV2-Lys47 (hereinafter referred to as hirudin) prepared in Example 9 used in anticoagulant blood collection tubes on routine blood tests and blood biochemical indexes were as follows, wherein the hirudin mutant HV2-Lys47 was applied to vacuum blood collection tubes by spraying.

(1) Routine Blood Tests

Routine blood testing indexes for hirudin anticoagulation vacuum blood collection tubes and K2• EDTA anticoagulation vacuum blood collection tubes were as shown in Table 3 below. Among them, 20 indexes of the two types of vacuum blood collection tubes were highly correlated (r value>0.8), and 4 indexes were moderately correlated (0.5<r value<0.8).

TABLE 3

Comparison of routine blood tests between hirudin anticoagulation and K2 · EDTA anticoagulation

| Testing indexes | K2 · EDTA | Hirudin | r | Regression equation |
|---|---|---|---|---|
| White blood cell count | 5.51 ± 1.38 | 5.36 ± 1.31 | 0.9611 | y = 0.9148x + 0.3116 |
| Large platelet ratio | 30.60 ± 8.55 | 28.60 ± 7.84 | 0.9533 | y = 0.8743x + 1.8428 |
| Percentage of monocyte count | 6.31 ± 1.54 | 5.20 ± 1.25 | 0.8332 | y = 0.6766x + 0.9319 |
| Absolute value of monocyte count | 0.34 ± 0.09 | 0.28 ± 0.09 | 0.8307 | y = 0.8406x − 0.0103 |
| Hematocrit | 39.72 ± 3.26 | 38.93 ± 3.03 | 0.9055 | y = 0.8436x + 5.424 |
| Red blood cell distribution width | 12.43 ± 0.86 | 12.37 ± 0.86 | 0.9953 | y = 0.9909x + 0.0547 |

TABLE 3-continued

Comparison of routine blood tests between hirudin anticoagulation and K2 · EDTA anticoagulation

| Testing indexes | K2 · EDTA | Hirudin | r | Regression equation |
|---|---|---|---|---|
| Red blood cell volume distribution width | 38.81 ± 1.66 | 37.86 ± 1.58 | 0.9580 | y = 0.9095x + 2.5645 |
| Percentage of lymphocyte count | 34.06 ± 8.14 | 34.83 ± 8.69 | 0.9901 | y = 1.0564x − 1.154 |
| Absolute value of lymphocyte count | 1.80 ± 0.29 | 1.79 ± 0.32 | 0.8877 | y = 0.9958x − 0.0011 |
| Mean red blood cell protein concentration | 339.29 ± 10.89 | 345.71 ± 10.57 | 0.9306 | y = 0.9033x + 39.229 |
| Mean red blood cell volume | 86.16 ± 3.66 | 84.52 ± 3.66 | 0.9947 | y = 0.9958x − 1.274 |
| Mean red blood cell hemoglobin content | 29.26 ± 1.93 | 29.24 ± 1.85 | 0.9881 | y = 0.9451x + 1.5826 |
| Mean platelet distribution width | 12.61 ± 2.24 | 12.27 ± 2.35 | 0.9287 | y = 0.9744x − 0.0188 |
| Mean platelet volume | 10.71 ± 1.05 | 10.47 ± 0.98 | 0.9603 | y = 0.8933x + 0.9055 |
| Percentage of basophil count | 0.65 ± 0.36 | 0.63 ± 0.27 | 0.7509 | y = 0.558x + 0.2646 |
| Absolute value of basophils | 0.03 ± 0.02 | 0.03 ± 0.01 | 0.7606 | y = 0.5811x + 0.0116 |
| Percentage of eosinophil count | 1.44 ± 1.13 | 1.37 ± 0.98 | 0.9614 | y = 0.8367x + 0.1639 |
| Absolute value of eosinophils | 0.07 ± 0.04 | 0.07 ± 0.04 | 0.9376 | y = 0.8635x + 0.0061 |
| Hemoglobin concentration | 134.92 ± 13.32 | 134.71 ± 12.74 | 0.9549 | y = 0.9129x + 11.539 |
| Red blood cell count | 4.61 ± 0.35 | 4.61 ± 0.30 | 0.8968 | y = 0.7758x + 1.0291 |
| Platelet hematocrit | 0.26 ± 0.04 | 0.17 ± 0.03 | 0.6616 | y = 0.5302x + 0.0368 |
| Platelet count | 242.08 ± 46.04 | 167.54 ± 39.44 | 0.7439 | y = 0.6372x + 13.276 |
| Percentage of neutrophil count | 57.29 ± 9.31 | 57.57 ± 9.47 | 0.9840 | y = 1.0017x + 0.1765 |
| Absolute value of neutrophil count | 3.25 ± 1.26 | 3.17 ± 1.19 | 0.9843 | y = 0.9328x + 0.1334 |

TABLE 4

Comparison of biochemistries, tumor markers and homocysteine between plasma anticoagulated with hirudin and routine serum

| Index | Serum | Hirudin | r | Regression equation |
|---|---|---|---|---|
| γ-glutamyl transpeptidase (γ-GT) | 16.28 ± 14.34 | 16.34 ± 14.58 | 0.9969 | y = 1.0139x − 0.1665 |
| Albumin (ALB) | 49.21 ± 3.04 | 51.34 ± 3.01 | 0.7981 | y = 0.7906x + 12.436 |
| Alanine transaminase (ALT) | 21.68 ± 8.1 | 22.24 ± 8.09 | 0.9623 | y = 0.9605x + 1.4162 |
| Aspartate transaminase (AST) | 21.88 ± 4.78 | 23 ± 4.97 | 0.9135 | y = 0.9514x + 2.183 |
| Indirect bilirubin | 8.26 ± 3 | 7.86 ± 2.86 | 0.9915 | y = 0.9432x + 0.065 |
| Globulin | 21.68 ± 1.11 | 23.73 ± 1.95 | 0.5224 | y = 0.9188x + 3.8097 |
| Serum total bile acid | 3.78 ± 1.05 | 3.78 ± 1.05 | 0.9864 | y = 0.986x + 0.057 |
| Direct bilirubin (DBIL) | 3.48 ± 1.36 | 3.58 ± 1.42 | 0.9966 | y = 1.0362x − 0.0252 |
| Total bilirubin (TBIL) | 11.74 ± 4.26 | 11.44 ± 4.16 | 0.9955 | y = 0.9722x + 0.0218 |
| Total protein (TP) | 70.89 ± 3.48 | 75.07 ± 4.31 | 0.8081 | y = 1.0011x + 4.1014 |
| Creatinine | 46.39 ± 6.86 | 45.77 ± 6.68 | 0.977 | y = 0.9526x + 1.5738 |
| Urea nitrogen | 4.88 ± 1.00 | 4.90 ± 1.00 | 0.985 | y = 0.9779x + 0.1258 |
| Uric acid | 284.74 ± 76.12 | 284.91 ± 76.80 | 0.999 | y = 1.0082x − 2.1655 |
| Low density lipoprotein cholesterol | 2.77 ± 0.61 | 2.83 ± 0.62 | 0.9870 | y = 1.0015x + 0.063 |
| Triglycerides (TG) | 0.96 ± 0.75 | 0.97 ± 0.76 | 0.9983 | y = 1.015x − 0.0021 |
| High density lipoprotein cholesterol | 1.61 ± 0.31 | 1.60 ± 0.33 | 0.9063 | y = 0.9393x + 0.0932 |
| Apolipoprotein A | 1.34 ± 0.13 | 1.35 ± 0.15 | 0.8966 | y = 1.0206x − 0.0182 |
| Apolipoprotein B | 0.79 ± 0.19 | 0.80 ± 0.19 | 0.9884 | y = 0.9995x + 0.0114 |
| Total cholesterol (T-CHO) | 4.39 ± 0.66 | 4.46 ± 0.70 | 0.9786 | y = 1.0271x − 0.0509 |
| Blood glucose | 5.45 ± 0.46 | 5.3 ± 0.46 | 0.9691 | y = 0.9714x + 0.0105 |
| Carcino-embryonic antigen (CEA) | 1.10 ± 0.41 | 1.20 ± 0.38 | 0.9423 | y = 0.8792x + 0.2359 |
| Alpha-fetoprotein (AFP) | 3.10 ± 2.71 | 3.14 ± 2.79 | 0.9979 | y = 1.0297x − 0.0548 |
| Serum carbohydrate antigen 199(CA-199) | 14.74 ± 14.53 | 13.58 ± 14.32 | 0.9875 | y = 0.9731x − 0.7697 |
| Homocysteine | 11.45 ± 5.12 | 11.94 ± 5.14 | 0.9948 | y = 0.9975x + 0.5176 |

(2) Blood Biochemistries, Tumor Markers and Homocysteine

The testing results of biochemistries, tumor markers and homocysteine of serum (separation gel/silica vacuum blood collection tubes) and plasma (hirudin vacuum blood collection tubes) were as shown in Table 4. Among them, 22 indexes of the two types of vacuum blood collection tubes were highly correlated (r value>0.8), and 2 indexes were moderately correlated (0.5<r value<0.8).

(3) Five Items of HBV

Five items of HBV are qualitative testing indexes, and the results are as shown in Table 5. The results showed that the testing indexes of serum and plasma were highly consistent, as the indexes which were negative for serum were also negative in the testing results of plasma, and the indexes which were positive for serum were also positive in the testing results of plasma.

TABLE 5

| Serial number | Hepatitis B surface antigen | | Hepatitis B surface antibody | | Hepatitis B E-antigen | | Hepatitis B E-antibody | | Hepatitis B core antibody | |
|---|---|---|---|---|---|---|---|---|---|---|
| | Serum | Hirudin | Serum | Hirudin | Serum | Hirudin | Serum | Hirudin | Serum | Hirudin |
| 1 | (−) | (−) | (+) | (+) | (−) | (−) | (−) | (−) | (−) | (−) |
| 2 | (−) | (−) | (+) | (+) | (−) | (−) | (−) | (−) | (−) | (−) |
| 3 | (−) | (−) | (+) | (+) | (−) | (−) | (−) | (−) | (−) | (−) |
| 4 | (−) | (−) | (−) | (−) | (−) | (−) | (−) | (−) | (−) | (−) |
| 5 | (−) | (−) | (−) | (−) | (−) | (−) | (−) | (−) | (−) | (−) |
| 6 | (−) | (−) | (+) | (+) | (−) | (−) | (−) | (−) | (−) | (−) |
| 7 | (−) | (−) | (+) | (+) | (−) | (−) | (−) | (−) | (−) | (−) |
| 8 | (−) | (−) | (−) | (−) | (−) | (−) | (−) | (−) | (−) | (−) |
| 9 | (−) | (−) | (+) | (+) | (−) | (−) | (−) | (−) | (+) | (+) |
| 10 | (−) | (−) | (+) | (+) | (−) | (−) | (−) | (−) | (−) | (−) |
| 11 | (−) | (−) | (+) | (+) | (−) | (−) | (−) | (−) | (−) | (−) |
| 12 | (−) | (−) | (+) | (+) | (−) | (−) | (−) | (−) | (−) | (−) |
| 13 | (−) | (−) | (+) | (+) | (−) | (−) | (−) | (−) | (−) | (−) |
| 14 | (−) | (−) | (+) | (+) | (−) | (−) | (−) | (−) | (−) | (−) |
| 15 | (−) | (−) | (+) | (+) | (−) | (−) | (−) | (−) | (−) | (−) |
| 16 | (−) | (−) | (+) | (+) | (−) | (−) | (−) | (−) | (−) | (−) |
| 17 | (−) | (−) | (−) | (−) | (−) | (−) | (−) | (−) | (−) | (−) |
| 18 | (−) | (−) | (+) | (+) | (−) | (−) | (−) | (−) | (−) | (−) |
| 19 | (−) | (−) | (+) | (+) | (−) | (−) | (−) | (−) | (−) | (−) |
| 20 | (−) | (−) | (−) | (−) | (−) | (−) | (−) | (−) | (−) | (−) |
| 21 | (−) | (−) | (+) | (+) | (−) | (−) | (−) | (−) | (−) | (−) |
| 22 | (−) | (−) | (+) | (+) | (−) | (−) | (−) | (−) | (−) | (−) |
| 23 | (−) | (−) | (−) | (−) | (−) | (−) | (−) | (−) | (−) | (−) |
| 24 | (−) | (−) | (+) | (+) | (−) | (−) | (−) | (−) | (−) | (−) |
| 25 | (−) | (−) | (−) | (−) | (−) | (−) | (−) | (−) | (−) | (−) |
| 26 | (−) | (−) | (−) | (−) | (−) | (−) | (−) | (−) | (−) | (−) |
| 27 | (−) | (−) | (+) | (+) | (−) | (−) | (−) | (−) | (−) | (−) |
| 28 | (−) | (−) | (−) | (−) | (−) | (−) | (−) | (−) | (−) | (−) |
| 29 | (−) | (−) | (−) | (−) | (−) | (−) | (−) | (−) | (−) | (−) |
| 30 | (−) | (−) | (−) | (−) | (−) | (−) | (−) | (−) | (−) | (−) |
| 31 | (−) | (−) | (+) | (+) | (−) | (−) | (−) | (−) | (−) | (−) |
| 32 | (−) | (−) | (+) | (+) | (−) | (−) | (−) | (−) | (−) | (−) |
| 33 | (−) | (−) | (+) | (+) | (−) | (−) | (−) | (−) | (−) | (−) |
| 34 | (−) | (−) | (+) | (+) | (−) | (−) | (−) | (−) | (−) | (−) |
| 35 | (−) | (−) | (+) | (+) | (−) | (−) | (−) | (−) | (−) | (−) |
| 36 | (−) | (−) | (+) | (+) | (−) | (−) | (−) | (−) | (−) | (−) |
| 37 | (−) | (−) | (+) | (+) | (−) | (−) | (−) | (−) | (−) | (−) |
| 38 | (−) | (−) | (−) | (−) | (−) | (−) | (−) | (−) | (−) | (−) |
| 39 | (−) | (−) | (+) | (+) | (−) | (−) | (−) | (−) | (−) | (−) |
| 40 | (−) | (−) | (+) | (+) | (−) | (−) | (−) | (−) | (−) | (−) |
| 41 | (−) | (−) | (+) | (+) | (−) | (−) | (−) | (−) | (−) | (−) |
| 42 | (−) | (−) | (−) | (−) | (−) | (−) | (−) | (−) | (−) | (−) |
| 43 | (−) | (−) | (−) | (−) | (−) | (−) | (−) | (−) | (−) | (−) |
| 44 | (−) | (−) | (+) | (+) | (−) | (−) | (+) | (+) | (+) | (+) |
| 45 | (−) | (−) | (+) | (+) | (−) | (−) | (−) | (−) | (−) | (−) |
| 46 | (−) | (−) | (+) | (+) | (−) | (−) | (−) | (−) | (−) | (−) |
| 47 | (−) | (−) | (−) | (−) | (−) | (−) | (−) | (−) | (−) | (−) |
| 48 | (−) | (−) | (+) | (+) | (−) | (−) | (−) | (−) | (−) | (−) |
| 49 | (−) | (−) | (+) | (+) | (−) | (−) | (−) | (−) | (−) | (−) |
| 50 | (−) | (−) | (+) | (+) | (−) | (−) | (−) | (−) | (−) | (−) |

The results show that the results of routine blood tests for hirudin anticoagulation were consistent with the results of K2•EDTA anticoagulation routine blood tests, and the testing indexes were highly or moderately correlated, which were consistent with the results of Menssen H (see "Measurement of Hematological, Clinical Chemistry, and Infection Parameters from Hirudinized Blood Collected in Universal Blood Sampling Tubes", Hans D. Menssen et al., SEMINARS IN THROMBOSIS AND HEMOSTASIS/VOLUME 27, NUMBER 4 2001, pp. 349-356). At present, serum samples are commonly used for the testing of clinical biochemical indexes. However, plasma samples are more approximate to physiological state than serum in theory. The results show that despite that there are poor correlation ($0.5 < r$ value $< 0.8$) in total protein, albumin and globulin between serum and plasma, there are high correlation ($r$ value $> 0.9$) in biochemistries, electrolytes, tumor markers and homocysteine. Since plasma contained fibrinogens, the protein concentration in plasma ($75.07 \pm 4.31$) was higher than that in serum ($70.89 \pm 3.48$).

It can be seen from the above that K2•EDTA and hirudin anticoagulant have similar effects, but K2•EDTA can only be used for the determination of routine blood tests, while hirudin blood collection tubes may also be used for the determination of biochemistries, electrolytes, tumor markers, homocysteine and other indexes of serum and plasma.

In addition, on the market at present, 40 ATU of hirudin is required per milliliter of blood to effect the anticoagulant activity of hirudin. The hirudin of the present application has a high purity, so its addition amount in the preparation of blood collection tubes is smaller than that of hirudin with a lower purity. Moreover, because of the high purity of hirudin of the present application, the effects of impurities if present on blood coagulation and blood index testing are avoided. Furthermore, due to the high purity, the hirudin of the present application has significantly better stability, and the specific data are as follows: Hirudin blood collection tubes (2 ml): (accelerated test temperature: 40° C.±2, humidity: 75%±5)

| Testing period | 0 week | 2 weeks | 1 month | 2 months | 3 months | 6 months |
|---|---|---|---|---|---|---|
| Blood collection tubes of the present application | 2625ATU | 2650ATU | 2625ATU | 2580ATU | 2600ATU | 2575ATU |
| Outsourced blood collection tubes | 3020ATU | 2800ATU | 2548ATU | 1890ATU | 1600ATU | 1500ATU |

The blood collection tube of the present application is the blood collection tube with a coating of dried hirudin mutant HV2-Lys47 prepared by lyophilization in Example 9. The outsourced blood collection tube is: Sarstedt from Germany, which is also a hirudin blood collection tube.

Those of ordinary skills in the art will appreciate that modifications or equivalent substitutions may be made to the technical solutions of the present application without departing from the spirit and scope of the technical solutions of the present application, all of which should be contained within the scope of the claims of the present application.

What we claim is:

1. A method for extracting and purifying hirudin mutant HV2-Lys47 (SEQ ID NO.: 1) from a fermentation broth of *Escherichia coli* for fermentative production of hirudin mutant HV2-Lys47, comprising the steps of:
   treating the fermentation broth of *Escherichia coli* at an elevated temperature to sterilize the fermentation broth and remove impurity proteins;
   treating the sterilized fermentation broth by a ceramic membrane to remove the bacteria;
   treating the resultant fermentation broth from the ceramic membrane by an ultrafiltration membrane to remove impurity proteins;
   treating the resultant fermentation broth from the ultrafiltration membrane by a nanofiltration membrane to obtain a concentrated solution of crudely separated hirudin mutant HV2-Lys47;
   adding a salt into the concentrated solution of crudely separated hirudin mutant HV2-Lys47 as an auxiliary material, followed by spray drying to obtain dry powder;
   dissolving the dry powder in water and filtering out impurities;
   subjecting the filtrate to molecular sieve column chromatography only once, eluting the same with water, and concentrating the collected solution to obtain a crude hirudin mutant HV2-Lys47, wherein the molecular sieve column chromatography is selected from the group consisting of dextran gel G-25, dextran gel G-50, dextran gel G-75, and dextran gel G-100; and
   dissolving the crude hirudin mutant HV2-Lys47 in water, adding an organic solvent thereto to precipitate the hirudin mutant HV2-Lys47, and vacuum drying the same to obtain a pure hirudin mutant HV2-Lys47,
   wherein the organic solvent is selected from one or more of ethanol, methanol, acetone, or isopropanol, and the volume of the organic solvent added is 5-9 times volumes of the aqueous solution in which crude hirudin mutant HV2-Lys47 is dissolved.

2. The method according to claim 1, wherein the treatment at the elevated temperature is 65° C.-67° C. for 5-20 min.

3. The method according to claim 1, wherein the salt is selected from one or more of sodium chloride, potassium chloride, ammonium sulfate, sodium sulfate, and potassium sulfate, and the weight in grams of the salt added as an auxiliary material is 5% or more of the volume in milliliters of the concentrated solution of crudely separated hirudin mutant HV2-Lys47.

4. The method according to claim 1, wherein concentrating the collected solution resulting from the molecular sieve column chromatography is conducted by vacuum concentration under reduced pressure, nanofiltration membrane concentration or reverse osmosis membrane concentration.

5. The method according to claim 1, wherein the volume in milliliters of water for dissolving the dry powder is 10 times or more of the weight in grams of the dry powder.

6. The method according to claim 1, wherein the fermentation broth of *Escherichia coli* is produced by culturing *Escherichia coli* pBH2 CGMCC No. 0908 with pBH-2 as an expression vector, and the culturing comprises culturing under aerobic conditions at temperature of 25° C.-35° C. until the end of the logarithmic growth phase, and then the temperature is elevated to 35° C.-45° C. for a further culturing until the yield of the hirudin mutant HV2-Lys47 reaches a peak.

7. The method according to claim 1, wherein the hirudin mutant HV2-Lys47 (SEQ ID NO.: 1) is directly added to an anticoagulant blood collection tube.

8. The method according to claim 7, wherein the anticoagulant activity of the obtained pure hirudin mutant HV2-Lys47 is greater than or equal to 18000 ATU/mg.

9. The method according to claim 1, wherein the hirudin mutant HV2-Lys47 is applied to the anticoagulant blood collection tube by being contained in a coating.

10. The method according to claim 7, wherein the hirudin mutant HV2-Lys47 is directly added to the anticoagulant blood collection tube in an amount of 8.5 µg/ml blood.

11. The method according to claim 9, wherein the hirudin mutant HV2-Lys47 is coated onto the anticoagulant blood collection tube by being contained in a coating, and then the coating is dried by vacuum lyophilization.

12. The method according to claim 7, wherein the anticoagulant blood collection tube is used to contain blood, and the blood is used for one or more tests of routine blood tests, blood biochemistries, electrolytes, tumor markers, homocysteine and five items of HBV.

13. The method according to claim 1, wherein the dissolving the dry powder in water and filtering out impurities comprises dissolving the dry powder in water and filtering out impurities by filter paper, a sand core funnel or a membrane device.

14. The method according to claim 9, wherein the hirudin mutant HV2-Lys47 is applied to the anticoagulant blood collection tube by being contained in a coating in an amount of 8.5 µg/ml blood.

* * * * *

UNITED STATES PATENT AND TRADEMARK OFFICE
CERTIFICATE OF CORRECTION

| | | |
|---|---|---|
| PATENT NO. | : 12,466,852 B2 | Page 1 of 1 |
| APPLICATION NO. | : 17/282303 | |
| DATED | : November 11, 2025 | |
| INVENTOR(S) | : Jiepeng Chen et al. | |

It is certified that error appears in the above-identified patent and that said Letters Patent is hereby corrected as shown below:

In the Specification

Column 7, Lines 56-57:
In the table, delete the line: "Ammonium Guangzhou Chemical Reagent Factory AR grade nitrate" in its entirety.

Column 7, Line 58:
In the table, delete "Peptone" and insert --Tryptone--.

Signed and Sealed this
Tenth Day of February, 2026

John A. Squires
*Director of the United States Patent and Trademark Office*